3,792,027
NOVEL COPOLYMERS

Hans Peter Panzer, Stamford, William Charles Firth, Jr., Wilton, Anthony Thomas Coscia, South Norwalk, and Lucille Elma Palmer, Darien, Conn., assignors to American Cyanamid Company, Stamford, Conn.
No Drawing. Filed Apr. 14, 1971, Ser. No. 134,057
Int. Cl. C08f 13/06
U.S. Cl. 260—73 R    4 Claims

ABSTRACT OF THE DISCLOSURE

A novel class of acrylamide-sulfur dioxide polymers, a method for their production, glyoxal reaction products thereof and paper treated with said reaction products, are disclosed.

BACKGROUND OF THE INVENTION

The present invention pertains to the field of polymeric materials and, more particularly, to the field of polymeric materials which may be utilized to impart improved wet and dry-strength properties to paper. The polymers are produced from acrylamide and sulfur dioxide and, when reacted with glyoxal, result in the production of a series of materials which unexpectedly impart a high degree of wet and dry-strength to paper.

Many olefins have been found to copolymerize with sulfur dioxide to form polysulfones, Ivin et al., Advances in Macromolecular Chemistry, vol. 1, Academic Press, N.Y., pp. 335–406. The presence of various substituents such as carbonyl groups or nitrile groups, however, being electronegative, can prevent polymerization. It was therefore unexpected that acrylamide and sulfur dioxide copolymerize readily even though cyclopentene, acrylamide and sulfur dioxide have been known to form terpolymers, Iwatsuki et al., J. Poly. Sci., Part A–1, vol. 6, page 2451, 1968. Japanese Pat. No. 9971, 1965 (Chem. Abstracts, vol. 64, page 3799, 1966) teaches the copolymerization of acrylamide and sulfur dioxide by irradiation at low temperatures, however, a subsequent report (Kuri, Kobunshi, vol. 18, pages 106–203, 1969) indicates that a similar system produced a copolymer containing only one percent sulfur.

We have now found that copolymers of acrylamide and sulfur dioxide can be prepared wherein the polymers contain a high percentage of sulfur. The polymers are easily recovered in relatively good yields.

SUMMARY

The novel acrylamide-sulfur dioxide copolymers of our invention find utility in the improvement of both the wet-strength and the dry-strength of paper, especially that composed of water-laid cellulose paper-making fibers. The polymers function as wet and dry-strengthening agents after having been reacted with glyoxal, with or without the addition of an anionic charge imparting substituent and preferably in the presence of a retention aid, as more fully described hereinbelow.

DESCRIPTION OF THE INVENTION INCLUDING PREFERRED EMBODIMENTS

The polymers of the present invention have the formula

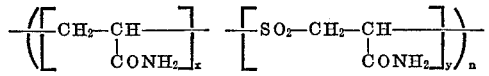

wherein the ratio of $x$ to $y$ ranges from about 10:1 to about 2:1, $n$ is a whole positive integer of at least about 6, the polymer containing up to about 7.5%, by weight, based on the total weight thereof, of sulfonate groups, i.e. —SO$_3$⁻.

The polymers are produced by heating the acrylamide in liquid sulfur dioxide at a temperature ranging from about 25° C. to about 100° C. under sufficient pressure to render and maintain the sulfur dioxide liquid.

The polymerization is conducted in the presence of a free-radical generating catalyst. From bout 0.01 to about 5.0% of the catalyst, by weight, based on the total weight of the monomers, may be used, with an amount ranging from about 0.1 to about 3.0%, by weight, same basis, being preferred.

Generally, any known free-radical generating catalyst may be employed with such compounds as methyl ethyl ketone peroxide, benzoyl peroxide, azobisisobutyronitrile, silver nitrate, calcium nitrate, cerous nitrate, ammonium nitrate, ceric ammonium nitrate, lauroyl peroxide, 2.5-dimethyl-2,5-di(t-butylperoxy)-n-hexane, dialkyl peroxides such as diethyl peroxide, di(t-butyl)peroxide, t-butyl hydrogen peroxide, cumene hydroperoxide, t-butyl perbenzoate and the like being exemplary.

The polymerization reaction should be allowed to continue for from about 1 hour to about 7 days, preferably from about 5 hours to about 3 days. The time of reaction is directly dependent upon the catalyst concentration and the temperature of reaction, lower temperatures and lower catalyst concentrations requiring longer reaction times.

The reaction should be conducted in the substantial absence of oxygen in order to assure best results. Oxygen can be excluded from the reaction vessel by any known means such as by evacuation, nitrogen blanket etc.

Up to about 10%, by weight, of the novel polymers of our invention can be a monoethylenically unsaturated acyclic monomer copolymerizable with the acrylamide and sulfur dioxide. For example, such monomers as methacrylic acid, itaconic acid, acrylic acid, the lower acrylic and methacrylic esters such as ethyl acrylate, methyl methacrylate etc., acrylonitrile, methacrylamide, etc. may be charged to the reaction vessel with the acrylamide and sulfur dioxide. Use of comonomers of this type is advantageous when various properties of the resultant polymer not possessed by the acrylamide-sulfur dioxide copolymer alone, are desired.

The novel polymers of our invention may contain up to about 7.5%, by weight, based on the total weight of the polymer, of sulfonate groups, i.e. —SO$_3$⁻. The presence of these groups results from various manipulations made during the polymerization. That is to say, if the reaction is conducted at a temperature ranging from about 80–100° C., sulfonate groups are produced. Also, if the reaction is conducted in the presence of methanol as a solvent, sulfonate groups are also introduced into the polymer.

The polymers of this invention are recovered from the reaction media by merely venting off the sulfur dioxide which remains after the reaction is complete. The precipitated copolymer is washed with methanol or acetone to remove unreacted acrylamide and recovered in relatively pure condition. Further removal of by-products etc. can be effected by washing with ethyl ether.

The polymers are solid and become molten between 216° C. and 226° C. with gas evolution. They are generally insoluble in cold water but copolymers having high concentrations of acrylamide and low inherent viscosities, indicative of low molecular weight, are substantially water soluble. All polymers are substantially soluble in dimethyl sulfoxide and hot water.

Additionally, we have found that the polyacrylamide sulfones, i.e. the copolymers of acrylamide and sulfur dioxide discussed hereinabove, represent unique starting materials useful in the preparation of short chain (low molecular weight) anionic polymers or oligomers by selective cleavage, of the sulfur-carbon bonds, of the acrylamide-SO$_2$ polymer chain with alkali, and simultaneous hydrolysis of carboxylamide groups to carboxyl groups.

Infrared analysis shows that the original sulfone links end up as sulfinic acid moieties probably located at the end of the now short organic polymer chains. Accordingly, depending on the acrylamide/$SO_2$, ratio of the starting material, that is, the average sequence distribution of the monomers in the copolymer, low molecular weight oligomers of defined chain length can be made. These low molecular weight oligomers are useful as antiprecipitants for calcium sulfate and carbonate, a dispersant for clays, silt, scale etc. and as sequestering agents and/or surface active materials.

Our novel oligomers have the general structure:

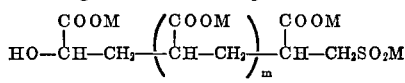

wherein $n$ is a whole positive integer of 1–9, inclusive and M is an alkali or alkaline earth metal.

They are produced by contacting the acrylamide-$SO_2$ copolymer charge material with a slight excess of hydroxide, carbonate etc. at a temperature ranging from about 50° C. to about 120° C. in an aqueous media. The amount of hydroxide, carbonate etc. employed is dependent upon the desired amount of cleavage of the copolymer. If total cleavage is to be accomplished, one mole of hydroxide, carbonate etc. per mole of acrylamide and one mole of hydroxide, carbonate etc. per mole of $SO_2$ in the copolymer should be used. Lesser amounts of carbonate, hydroxide etc. may be used if less than total cleavage of the charge copolymer is required.

The copolymer is allowed to remain in contact with the aqueous solution of carbonate, hydroxide etc. for from about 30 minutes to 24 hours, preferably from about 2 hours to about 18 hours.

The solution is then allowed to dry by evaporation of the water, neutralization thereof to about a pH of 7.0 being conducted, if desired, and the resultant powdery oligomer then remains.

Examples of suitable compounds useful in producing the novel oligomers of the instant invention include sodium hydroxide, sodium carbonate, potassium hydroxide, potassium carbonate, barium hydroxide, calcium hydroxide and the like.

The following examples are set forth for purposes of illustration only and are not to be construed as limitations on the present invention except as set forth in the appended claims. All parts and percentages are by weight unless otherwise indicated.

EXAMPLE 1

To a suitable glass pressure reaction vessel are added 19.98 parts of acrylamide and 0.170 part of azobisisobutyronitrile. The vessel is cooled with liquid nitrogen, evacuated and brought to atmospheric pressure with dried nitrogen three times. The reactor is evacuated and 67.2 parts of sulfur dioxide are added by transfer through a vacuum line. The resultant mixture is heated to 50° C. for 8 hours and allowed to stand 16 hours at room temperature. The reactor is cooled, the product washed with cold methanol, collected on a filter, washed again with methanol and dried in vacuo at room temperature and finally at 74–80° C. in vacuo for 18 hours. 20 parts of a white solid powder of copolymer is recovered. The copolymer has an inherent viscosity determined at 30° C., 0.5% concentration, of 0.56 in dimethyl sulfoxide. Analysis shows 39.34% carbon, 6.05 hydrogen, 14.97% nitrogen, 8.94% sulfur. The averaged weight percent acrylamide is 76.78 and 17.86 weight percent sulfur dioxide. Sulfur dioxide bands (cm.$^{-1}$) at 1305 and 1128, carbonyl bands at 1665 and amino bands at 3440, 3365, 3205 and 1615 are detected.

EXAMPLE 2

A mixture of 3.0 parts of acrylamide, .024 part of azobisisobutyronitrile, 8.0 parts of sulfur dioxide and 7.1 parts of methanol is heated in a sealed glass pressure reactor for 16 hours at 50° C. The resultant white, powdery product is washed with methanol and dried in vacuo at 80° C. It is soluble in water and gives an acidic reaction. The infrared spectrum shows strong $SO_2$ absorptions at 1128 and 1305 cm.$^{-1}$ and strong bands in the 1180 and 1040 cm.$^{-1}$ region, indicating ionic sulfonate. Titration to the thymol blue endpoint gives a sulfonate content of 7.5%.

Following the procedure of Example 1, various other polymerization reactions with acrylamide and sulfur dioxide are conducted. The catalysts employed are varied as are the reaction conditions as indicated. The results are 1615 are detected.

TABLE I

| Ex. | Parts acrylamide | Parts $SO_2$ | Catalyst | Parts | Reaction Time | Temp., °C. | Parts polymer | Inherent viscosity [1] |
|---|---|---|---|---|---|---|---|---|
| 3 | 1.0 | 7.2 | Benzoyl peroxide | .013 | 1 day | 25 | 0.14 | |
| 4 | 15.0 | 31.5 | Cerous nitrate | .027 | 5 days | 25 | 16.0 | 0.76 |
| 5 | 15.0 | 46.0 | Ammonium nitrate | .060 | 18 hours | 25 | 10.9 | 0.49 |
| 6 | 1.98 | 8.3 | MEKP | .025 | 5.5 hours | 50 | 0.85 | 0.51 |
| 7 | 3.75 | 12.6 | AIBN | .032 | 8 hours | 50 | 4.3 | 0.52 |
| 8 | 10.0 | 50.0 | AIBN | .085 | 5 hours | 80 | 7.3 | [2] 0.29 |
| 9 | 10.0 | 50.0 | AIBN | .085 | 5 hours | 100 | 8.6 | [2] 0.33 |

[1] Measured as in Example 1.
[2] In aqueous 1 N sodium nitrate.
NOTE.—AIBN=Azobisisobutyronitrile. MEKP=Methyl ethyl ketone peroxide.

EXAMPLE 10

9.0 parts of a sulfur dioxide-acrylamide copolymer, produced as in Example 1, analysis of which shows 37.96% carbon, 5.60% hydrogen, 13.86% nitrogen and 11.56% sulfur, are added to a suitable reaction vessel containing 72.5 ml. of 10% aqueous sodium hydroxide, a 10% excess of that calculated for total cleavage.

The vessel is heated to 82° C. on a steam bath for 18 hours. The originally insoluble polymer rapidly dissolves to a clear solution.

The resultant solution is dried overnight to a white, brittle solid, 14.8 parts. The polymer is water-soluble and has an inherent viscosity in 1 N sodium nitrate of 0.05.

Infrared analysis shows the presence of carbonyl groups and the sulfinate group —C—$SO_2$Na. No $SO_2$, no $SO_3$ and substantially no $CONH_2$ groups are shown.

EXAMPLES 11–12

Substitution of equivalent amounts of potassium carbonate and barium hydroxide for the sodium hydroxide of Example 10, results in a similar product.

As mentioned briefly above, our novel acrylamide-$SO_2$ polymers find utility as agents for increasing the wet strength and dry strength of paper. However, the polymers are not useful per se for this purpose. They first must be modified by chemical reaction and preferably also rendered anionic.

According to the instant invention, the acrylamide-sulfur dioxide polymers are first reacted with glyoxal under known reaction conditions. U.S. Pat. No. 3,556,932 sets forth the technique for conducting such reactions and said patent is therefore hereby incorporated herein by reference.

The reaction of the acrylamide-sulfur dioxide polymer with the glyoxal incorporates —CHOHCHO groups onto the polymer through reaction with the —$CONH_2$ (amide)

groups of the polymer. The resultant polymers are thereby rendered thermosetting provided that at least about 0.1 —CHOHCHO groups per glyoxal reactive —$CONH_2$ group in the polymer are present.

The reaction of the acrylamide-sulfur dioxide polymer with glyoxal is conducted by heating a solution of the glyoxal and the polymer until a significant increase in viscosity is observed. The resultant solution can be cooled to ambient temperature and stored until required. During the reaction, not all of the glyoxal is reacted and generally only up to about one-half of the amount charged reacts. Of the half that reacts, most reacts to the extent of only one of its functionalities, thereby introducing the —CHOHCHO groups onto the polymer. A small amount of glyoxal reacts at both of its functionalities so as to cross-link tow polymer molecules and thereby cause the increase in viscosity mentioned above. If the resultant glyoxalated polymer is to be used to treat papermaking fibers, the unreacted glyoxal need not be eliminated from the solution since it is not substantive to the fibers in normal beater addition applications. As a general rule, one mole of glyoxal should be charged to the reaction vessel for every two or more glyoxal-reactive amino groups in the polymer being glyoxalated.

The glyoxal may be reacted with the acrylamide-sulfur dioxide polymer before or after the polymer is rendered anionic, the anionic products being preferred for imparting wet and dry strength to paper.

The polymers may be rendered anionic utilizing any procedure known to those skilled in the art. Illustrative of such procedures are incorporation of anionic groups into the polymer such as by copolymerization of the acrylamide and sulfur dioxide with a water-soluble vinyl compound e.g. acrylic acid, methacrylic acid, vinylbenzene sulfonic acid, as mentioned above. Additionally, the anionic substituents may be formed in situ on the acrylamide-$SO_2$ polymer per se by partial hydrolysis thereof to convert the $CONH_2$ groups to COCH groups or salts thereof. Additionally, ester comonomers may be copolymerized with the acrylamide-sulfur dioxide polymer and subsequently hydrolyzed with acid to COOH groups.

A third and more preferable method for incorporating anionic groups onto our novel acrylamide-$SO_2$ polymers is by reaction thereof with a bisulfite of an alkali metal, such as sodium bisulfite, potassium bisulfite and the like to incorporate —$CHOHSO_3X$ groups thereon, X being hydrogen or an alkali metal.

The glyoxalated polymers are conveniently employed in the manufacture of wet and dry-strength paper as dilute aqueous solutions. The solutions can be applied to preformed paper by the well-known tub method, but, more preferably are applied by adding them directly to papermaking fibrous suspensions at any point in the papermaking process where wet and dry-strength additives are usually charged.

The glyoxalated polymers are rapidly and substantially adsorbed by the fibers at pH values within the range of 3.5 to 8.0, the use of a retention aid being necessary in the case of beater additions of the polymer. A substantial amount of wet and dry strength is imparted when the amount of polymer adsorbed by the fibers is as little as 0.1% of the dry weight of the fibers, smaller or larger amounts up to about 2.0% are tolerable.

When retention aids are used, alum is preferred. The alum may be added to the paper fibers before or after the addition of the polymer in amounts known to those skilled in the art. Additionally, the other known retention aids such as adipic acid-diethylenetriamine-epichlorohydrin resins (U.S. 2,926,154), polyethyleneimine, alkylene polyamine resins (U.S. 3,248,353), polyvinylpyridine quaternized with butyl bromide and the like may be used.

As above, the following examples are set forth for purposes of illustration only and are not to be construed as limitations on the present invention except as set forth in the appended claims. All parts and percentages are by weight unless otherwise specified.

EXAMPLE 13

To a suitable reaction vessel are added 15 parts of a 7.9 to 1 acrylamide-sulfur dioxide copolymer prepared as in Example 9. 100 parts of hot water containing 1.5 parts of 0.1 M sodium acid phosphate buffer are added to dissolve the copolymer. To the resultant solution is added 13.7 parts of a 40% aqueous glyoxal solution. The pH is adjusted to 7.3 with potassium carbonate solution. The viscosity of the resultant reaction mixture increases rapidly at 25° C. indicating attachment of the glyoxal to the amide units of the polymer with some cross-linking. After 1 hour at 25° C., a Gardner Holdt reading of T is observed. The solution is then diluted with aqueous acid to bring the total solids to 1.5% and the pH to 3.5. The solution is designated as Solution 1.

EXAMPLE 14

To 70 parts of Solution 1 are added small portions of sodium bisulfite until the bisulfite/total glyoxal (reacted and unreacted) ratio is 1:1 molewise. The bisulfite powder dissolves and reacts with a concurrent increase in pH from 3.5 to 4.8. The pH is then adjusted to 5.6 with a few drops of dilute sodium hydroxide solution and the resultant solution is designated as Solution 2.

EXAMPLES 15–16

To an aqueous furnish at 0.6% consistency composed of a mixture of bleached hard wood and soft wood kraft paper fibers beaten to a Canadian standard freeness of 505 ml., are added sufficient amounts of Solution 1, above, so that the total amount of polymer based on fiber is 0.5%. The same is done to a second furnish with Solution 2, above. The mixtures are each adjusted to pH 7.0 by use of dilute sodium acid phosphate and sodium hydroxide solutions and handsheets are formed in diluted condition from each. The wet handsheets are pressed between blotters and dried for one minute on a rotary laboratory drum dryer at 240° F. Two sheets of 65–70 pound basis weight paper are formed. The results of testing on these sheets are set forth in Table II, below.

TABLE II

| Ex. | Polymer solution number | Percent polymer applied | Retention aid | Percent | Basis weight, lbs. | Burst strength, p.s.i. | Percent improvement | Wet tensile strength lbs./in. |
|---|---|---|---|---|---|---|---|---|
| 15 | 1 | .35 | Amine resin [1] | .15 | 69.3 | 49.7 | 20 | 3.23 |
| 16 | 2 | .35 | do | .15 | 67.3 | 51.2 | 23 | 3.74 |
| 17 (Comp.) | | | | | 65.0 | 41.6 | | 0.97 |

[1] Commercially available polyamine resin which when used alone produces no wet or dry strength improvement.

Following the procedures of Examples 13 and 14, various of the polymers of Examples 1–8 were treated and utilized to improve paper-making fiber as in Examples 15 and 16. The polymers utilized, the amounts thereof and retention aids added are set forth in Table III, below.

In each instance, the burst strength (p.s.i.) and wet tensile strength (lbs./in.) of the resultant paper handsheets were equivalent to those of the products of Examples 15 and 16 of Table II.

TABLE III

| Example | Polymer of Example number | Treated as in Example number | Percent polymer applied to fibers | Retention aid (percent) | |
|---|---|---|---|---|---|
| 18 | 1 | 13 | .40 | Alum (.25). | |
| 19 | 4 | 14 | .38 | Do. | |
| 20 | 7 | 13 | .29 | Do. | |
| 21 | 2 | 14 | .50 | As in Ex. 15. | |
| 22 | 5 | 14 | .50 | Do. | |
| 23 | 8 | 14 | .35 | Do. | |
| 24 | 9 | 13 | .37 | Do. | |

What is claimed is:

1. A polymer consisting essentially of units having the formula

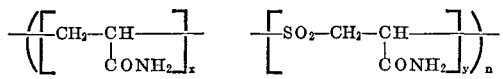

wherein the ratio of $x$ to $y$ ranges from about 10:1 to about 2:1, $n$ is a whole positive integer of at least about 6, said polymer containing up to about 7.5%, by weight, based on the total weight thereof, of sulfonate groups.

2. A polymer according to claim 1 containing at least about 0.1 —CHOHCHO groups per glyoxal reactive —CONH₂ group.

3. An anionic polymer according to claim 1 containing at least about 0.1 —CHOHCHO groups per glyoxal reactive —CONH₂ group.

4. An anionic polymer according to claim 3 wherein the anionic groups are —CHOHSO₃X groups, X being hydrogen or an alkali metal.

References Cited

UNITED STATES PATENTS 3,686,151  8/1972  Keim _____ 260—79.3 A

FOREIGN PATENTS 1,659,971  5/1965  Japan _____ 260—79.3 A

JAMES A. SEIDLECK, Primary Examiner

C. A. HENDERSON, JR., Assistant Examiner

U.S. Cl. X.R.

162—168; 260—79.3 A, 79.3 R, 513.7